United States Patent
Dew et al.

[19]

[11] Patent Number: 5,850,066
[45] Date of Patent: Dec. 15, 1998

[54] DIAGNOSTIC SYSTEM FOR A WELD CONTROLLER

[75] Inventors: Larry A. Dew, Durham; William B. Davidson, Apex; Timothy E. Miller, Clayton, all of N.C.

[73] Assignee: Square D Company, Palatine, Ill.

[21] Appl. No.: 771,094

[22] Filed: Dec. 20, 1996

[51] Int. Cl.[6] .................................................. B23K 11/25
[52] U.S. Cl. .......................................................... 219/109
[58] Field of Search .................................... 219/110, 108, 219/109; 364/474.16, 474.19

[56] References Cited

U.S. PATENT DOCUMENTS

| | | | |
|---|---|---|---|
| 3,546,421 | 12/1970 | Meyer et al. | 219/110 |
| 4,945,201 | 7/1990 | Ito et al. | 219/110 |
| 5,166,491 | 11/1992 | Izume et al. | 219/110 |
| 5,260,878 | 11/1993 | Luppy | 364/474.16 |
| 5,291,416 | 3/1994 | Hutchins | 364/474.16 |
| 5,637,241 | 6/1997 | Moates | 219/109 |
| 5,667,704 | 9/1997 | Kolodziej | 219/108 |

*Primary Examiner*—Clifford C. Shaw
*Attorney, Agent, or Firm*—Michael J. Femal; Larry I. Golden

[57] ABSTRACT

A weld controller is coupled to a communications network which has an operator interface unit for monitoring and controlling the weld controller and other weld controllers on the network. A time of day clock provides a chronological reference to tag weld current and voltage data and other data when it occurs for storage in its memory which is also accessible by the operator interface unit for storing in said system database. A memo pad in the weld controller is also accessible to the network for storing data for diagnostic purposes, said data including faults, events, and other operational data. The data can then be displayed, edited, and stored by the operator interface's program.

24 Claims, 8 Drawing Sheets

DIAGNOSTIC SYSTEM FOR A WELD CONTROLLER

DESCRIPTION

1. Technical Field

Applicant's invention relates generally to the field of weld controllers and more particularly to a system for providing weld controller diagnostics over a communication network to an operator interface unit coupled to a common database management system.

2. Related Application

This application is related to the following, commonly assigned application filed concurrently herewith, entitled "Common Database System For A Communication Network" (application Ser. No. 08/770,450, Applicants Docket No. RLA-20) and "Weld Controller System For Coupling To A Common Database System On A Communication Network" (application Ser. No. 08/771,620, Applicants Docket No. RLA-24). The contents of these Applications are expressly incorporated herein by reference.

3. Background Art

Many methods have been utilized to maintain consistent welds within the contact area between the weld gun contact tips and the material to be welded. As the contact tips deteriorate, the contact area increases, resulting in a decrease in the current density at the weld nugget. This results in a decreased heat input and can result in weld defects. Compensation for this decrease in current density over the life of the tips can be accomplished through several different methods to increase or boost the heat. Less heat is required during the first or early stage of the contact tips' life. Once the contact tips have settled in, during a second stage, a gradual increase in heat is required. During the last stage, as the contact tips start to deform, even more heat is required. These three stages form the basis for various weld control programs having a sequence of steps to maintain the integrity of the welds. As an example, some weld controllers employ a manual stepper to adjust for the heat boost, which typically is increased as a series of scheduled linear steps as specified by a weld engineer. Adaptive steppers vary the schedule not only as a function of the number of welds made, but also by a time rate resistance change between the contact tips. Another approach has been to use constant current controls, using current limit settings to track a user profile programmed in the stepper control. All of these methods have their advantages and disadvantages. One method may be more suitable than another one for a particular type of weld. This could be very critical in high quality, high production resistance weld applications, as would be commonly used for automobile manufacturing applications. In many instances, a production line will have a mixture of weld controllers to take advantage of each welder's best mode of operation for the type of weld required.

Operator interfaces are used to monitor and control the many different type of processes. Weld controllers can have data entry panels for entering different weld schedules, setting parameters, and so on. Monitors can be used to display selected data. These are usually dedicated to a given weld controller or to a network of weld controllers having the same type of control. With a production line having different types of contollers, it becomes difficult to couple them to a common operator interface control unit for centralized monitoring and control functions because of a mix of dissimilar data structures on the same network. With a central operator interface, diagnostic capabilities of the weld controllers become increasingly important. It would be preferrable to have a weld controller with increased diagnostic capabilities to take advantage of the network operator interface control system which is generally adaptable to resistance welders utilizing a variety of control strategies regardless of the types of data handled by each weld controller.

SUMMARY OF THE INVENTION

Accordingly, the principal object of the present invention is to provide a weld controller with increased diagnostic capabilitites for coupling to a network having an operator interface system for monitoring and controlling the weld controller.

A further objective of the invention is to provide a common database accessible across a communication network between the weld controller and the operator interface system, regardless of having dissimilar data structures.

Still a further objective of the invention is to provide an apparatus for displaying, storing, and editing data obtained from the network.

In the preferred embodiment of the invention, the invention is comprised of a system of elements including, but not limited to at least one weld controller acting as a slave device, and at least one master device, such as an operator interface unit, data acquisition device, or a network gateway device coupled to a common communications network. Each weld controller has a timer module for generating firing signals to a power module that ultimately supplies weld power to the weld gun contact tips. The timer module includes a central processing unit (CPU) for executing a weld schedule stored in a memory resident in the timer. A communication port couples the timer module to the network. The operator interface unit also is coupled to the network by a communication port. Communication among the devices connected to the network is deterministic, with one device acting as the master and the other devices as slaves at any point in time. Each device has an assigned hierarchy as to when and if it can control the network and act as the master. When it has control, it can address another device to either send data or receive data. The physical layer of the network uses a simple bus topology, with active nodes for connecting the different devices anywhere between the two network ends.

The weld controller includes a time of day clock which is used to provide a chronological reference point which is used to tag data captured by the weld controller during its operation. This clock can be read and synchronized with the master device. Using data from the clock, a runtime clock accumulates actual runtime of the welder and can provide a time base to log events within the weld controller.

Data from each slave device can be accessed by the master device based upon the slave's individual data structure and type through embedded objects resident in the master device's operating system and program. The data can then be displayed, edited, and stored by any data entry device that is capable of executing the master's program. The use of slave object models, derived from a base class object, provides a data layer interface between the data display layer and the physical network connection. This will allow additional new and different slave devices to be integrated into an existing network regardless of the types of data handled by each slave device.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
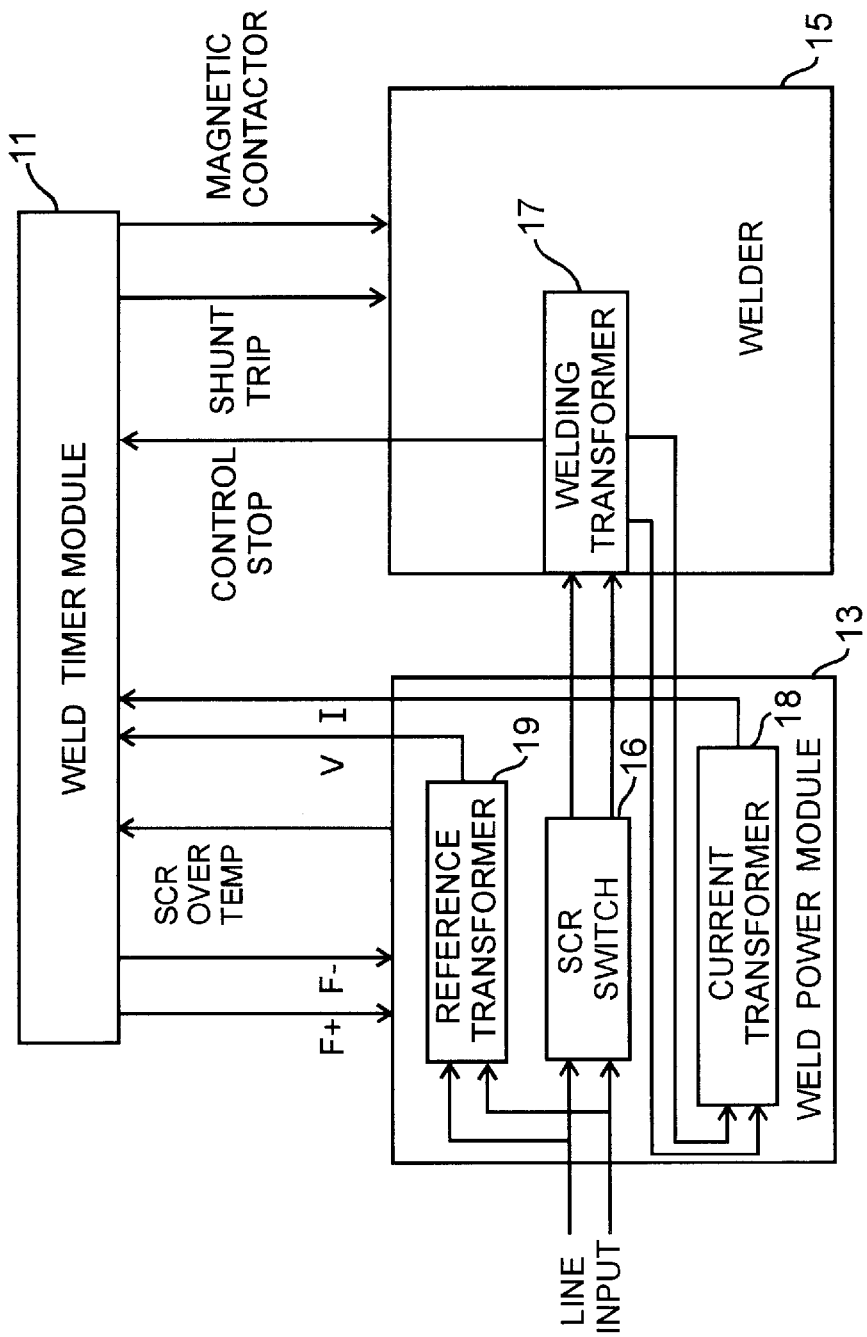
FIG. 1 is a block overview diagram showing a typical weld controller system.

FIG. 1 illustrates a typical welder system 10 consisting of a weld timer 11, welder power module 13, and welder 15. Weld timer 11 generates firing signals F+ and F− used to energize or turn on silicon controlled rectifier (SCR) switch 16 which is coupled to welding transformer 17 to supply power to contact tips and the workpiece being welded. The primary current of welding transformer 17 is monitored by using a toroidal current transformer 18 coupled to its primary circuit. A reference transformer 19 monitors the incoming line input voltage. In addition to voltage V and current I signals, weld timer 11 receives an over-temperature signal from the SCR switch 16 for use in control algorithms within the weld timer 11 as a protective feature to control or shutdown the welder 10 if the SCR switch reaches a predetermined temperature. Specific implementation details of a welder system 10 may be found in U.S. Pat. No. 4,945,201, although such details are not necessarily required for a correct understanding of the present invention.

Figure 2:
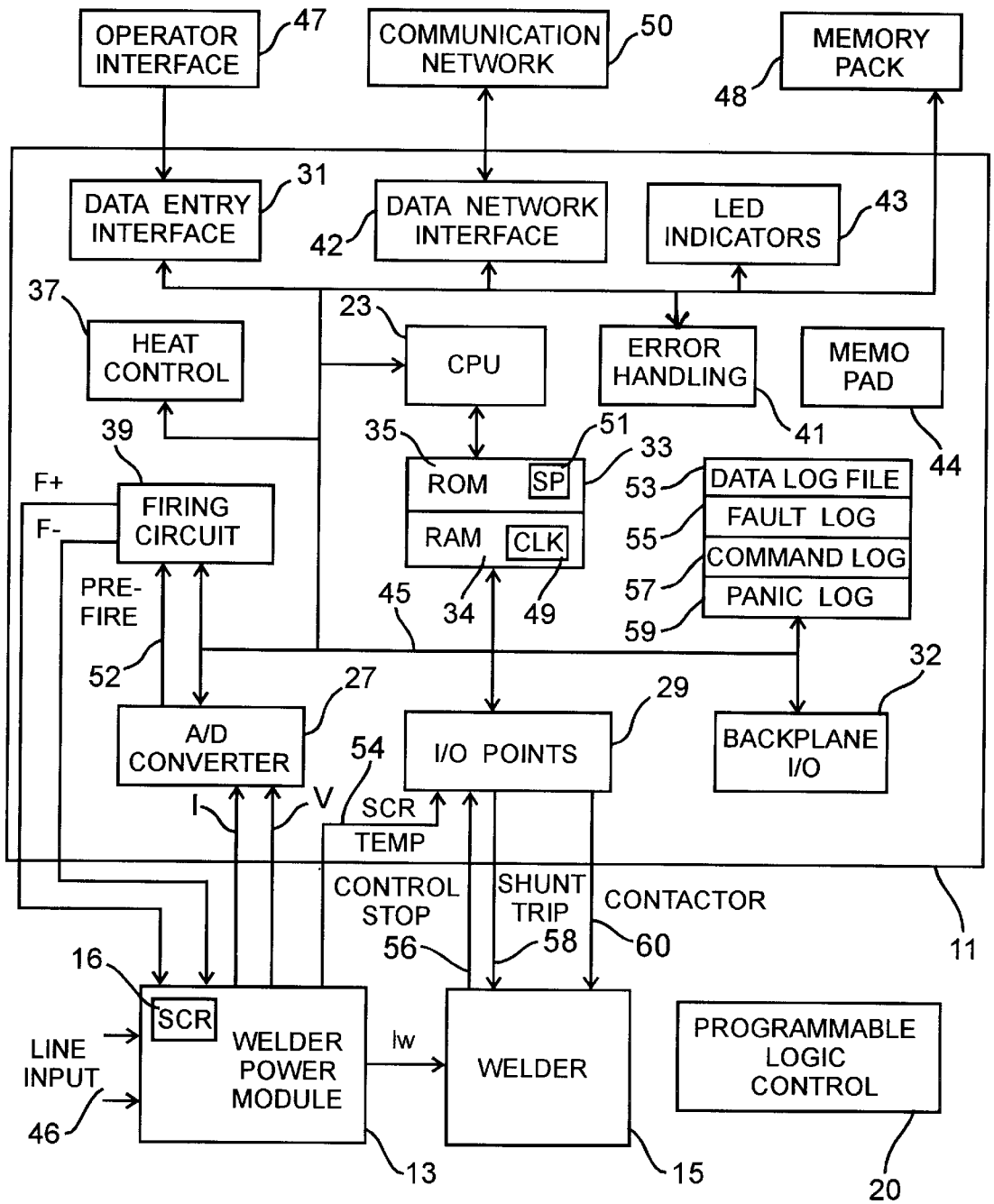
FIG. 2 is a detailed block diagram showing a typical welder and weld controller system that could implement an operator interface and communication system according to the present invention.

Referring to FIG. 2, a block diagram details a welder 15 and weld timer 11 adaptable to include a network interface system according to the present invention. The weld timer 11 may be part of a larger system controlled by programmable logic controller (PLC) 20 or it may be self-contained. A backplane interface 22 provides a means of coupling the PLC 20 to microprocessor (CPU) 23 to a data bus 25. CPU 23 is also coupled via data bus 25 to A/D converter 27, input/output interface 29, memory 33 comprising both random access memory (RAM) 34 and read only memory (ROM) 35, firing circuit 39, and LED indicators 43 which provide status information of the weld timer 11. Also coupled to the data bus 25 are two communication ports 31 and 42. The data entry interface port 31 is used to couple an operator interface unit 47 having a keyboard to the weld timer for manually entering data to the control. The network interface port 42 provides the connection to the communications network 50 of the present invention. Interface units 31 and 42 can be set to communicate individually or simulataneously.

Control and timing signals required for operation of the CPU 23 are not shown as they are well known to those skilled in the art and not an object of the present invention. A program stored in ROM 35 provides control of the power module 13 and welder 15 and the welding process by operation of CPU 23. This program will generate SCR firing signals F+ and F− through firing circuit 39 to control the weld sequence in response to various input signals. A two channel A/D converter 27 converts analog signals I and V from welder power module into digitized signals 45 which represent welding transformer 17 primary weld current Iw and power line input voltage 46, respectively. The digitized signals 45 are placed on bus 25 for storage in RAM 34 and for use as feedback control signals in execution of a weld control program or schedule 51 resident in ROM 35. The A/D converter 27 also generates a prefire signal 52 for input to firing circuit 39. An enable signal is also generated by control program 51 to prevent erroneous firing due to a possible program "hang-up" since two actions, prefire and enable, are required before the firing signals F+, F− are generated. Details regarding the firing circuit 39 and A/D converter 27 are well known and will therefore not be described further.

The input/output interface 29 receives an input 54 from welder power module 13 if the temperature of the SCR switches 16 reaches a predetermined set point, indicative of an overtemperature condition. The temperature is monitored every weld cycle and if it reaches the set point, input 54 will cause the control program 51 to disable the weld current Iw and put an error message in error handling 41 which is actually a portion of the weld control program 51 in ROM 35. Control stop signal 56 is a signal generated within welder 15 as an interlock control and will be activated if an operator or an external device causes the interlock to open. Again, this signal 56 will cause the control program 51 to disable the weld current Iw and put an error message in the error handling 41. The external device is normally a palm button that is depressed to indicate an emergency condition that requires an immediate cancellation of the welding cycle. Since a shorted SCR switch 16 would result in continuous current to the welder 15, a shunt trip circuit breaker is placed in series within welder 15 to remove power if a shorted SCR condition occurs. This condition is assumed to exist if current I is sensed at a time when it has not been commanded by the welder control 11. The welder control 11 will generate a shunt trip signal 58 to cause the circuit breaker to trip out under the shorted SCR condition. An additional output 60 controls a magnetic contactor for use within the welder 15 and is energized when a welding sequence begins.

A memo pad 44 that is accessible to the network 50 for retrieval by a user interface for diagnostic purposes can be used for store user data. This provides a static memory that a user can use to enter data that may be pertinent to that particular timer, such as date installed, number of operations on a particular date and so on.

An external memory pack 48 can be coupled to the data bus 25. This memory pack can be used to provide a backup for the weld control program 51 and other pertinent data.

This will allow a defective timer module to be replaced with a new one without having to reprogram it.

The control program 51 also includes means for a time of day clock 49. This could be either a hardware or software clock. The value of the clock is used to chronologically tag data captured by the timer. This data could include operating conditions at each weld schedule point, such as number of welds, conduction angle, weld current and voltage, and so on. Faults and invalid commands received by the timer that do not meet criteria defining command validity can also be stored with the time stamp. This data can therefore be identified and referenced relative to the time of its occurrence. To prevent memory overload, the data can be maintained in the error handling 41 memory as a sliding window. Data could be maintained for a set period of time or for a set number of operations, for instance. A data log file 53 in a non-volatile memory provides an operational file for also storing the faults in a fault log 55, the invalid commands in a command log 57 and certain conditions in a panic log 59. The panic log is used to store events that violate certain set rules concerning the operation of the weld controller. The occurance is stored in non-volatile memory. A status bit in a message field will be set to indicate that a panic occurance took place. The file 53 is always available to the communications network 50. The time of day clock can also be used to provide a time based automatic backup of data to a memory pack and to the memo pad 44 for retrieval and storage in a system database located in the user interface.

Figure 3:
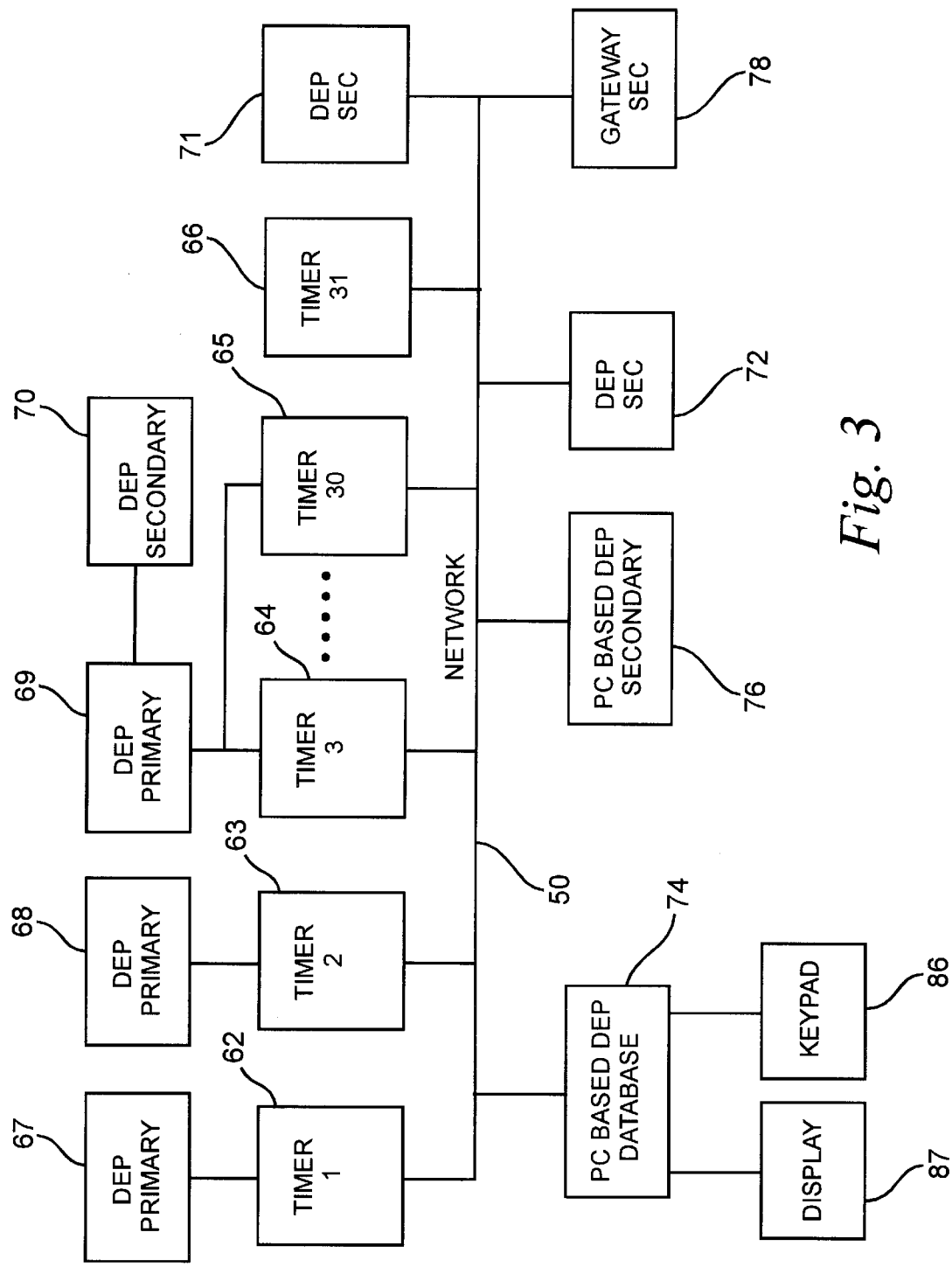
FIG. 3 is a simplified block diagram of a series of weld controllers coupled to a communications network according to the present invention.

In one embodiment of the present invention, the network configuration consists of a communications network 50 having a series of different timer modules 62–64 coupled to it as shown in FIG. 3. Each timer module functions similar to the timer module 11 of FIG. 2 and may have dedicated data entry panels (DEP) 67–68 for entering data, weld schedules, and other operating information to it. DEP 69 provides a means to couple timers 64–65 to a separate communication network through DEP secondary 70. Separate DEPs 71 and 72 could be directly coupled to the network 50. A PC based data entry panel 74 acts as the master interface unit and is used for displaying, monitoring, and editing the individual timer modules 62–66. A second PC based DEP 76 could also be present, as could a gateway 78 that provides a connection to other communication networks.

The minimum network connection is a single master device and a single slave unit. A timer module 62–66 is always a slave unit. The other devices on the network are considered master devices, each functioning in one of several modes of operation—database master 74, primary master 67, or secondary master 76. A network arbiter is the master device that currently controls traffic flow across the network. There can only be a single network arbiter at any given time on the network. The PC based DEP 74, in one mode, acts as the master database device. This has the highest priority and is the only master device that can automatically download data to a slave unit. This device will always attempt to take control of the network arbiter. A primary device will attempt to take control of the network arbiter in the absence of the database device. A secondary master will listen for an access grant from the current network arbiter before initiating a message packet on the network. If no database master or primary master exists on the network, the secondary device with the highest priority, as defined during setup, assumes the role of network arbiter as a pseudo-primary device. It will remain in that role until a database or primary master reattaches to the network.

A primary device, one of the other several operator interfaces 76, DEPs 71-72, or gateway device 78, may be demoted to a pseudo-secondary device if a database device attempts to reattach to the network. A pseudo-secondary device then is a primary device that has given up network arbitration after the database or another primary device has taken control of the network as the arbiter. It assumes the physical address of this device type as a secondary type. This type of device will assume secondary mastership functionality unless it connects to the network and it hears no other network traffic. If no traffic is detected it will promote itself to primary. In this mode it will be the network arbiter until a device of higher arbitration priority takes control and will be known as a pseudo-primary device as long as it is acting as the network arbiter. It will return to secondary device status if another device of higher arbitration priority takes control of the network. A master is considered attached if the network arbiter has granted this master use of the network. A device is considered connected if the device is physically connected to the network and is listening to or for network traffic.

Weld timers 62–66 acting as the slaves will function normally even if no master device is present. They can be programmed and monitored by their individual DEPs 67–70 independent from the network 50. They can transmit data across the network 50 only in response to request messages received from the network and cannot initiate any messages.

Figure 4:
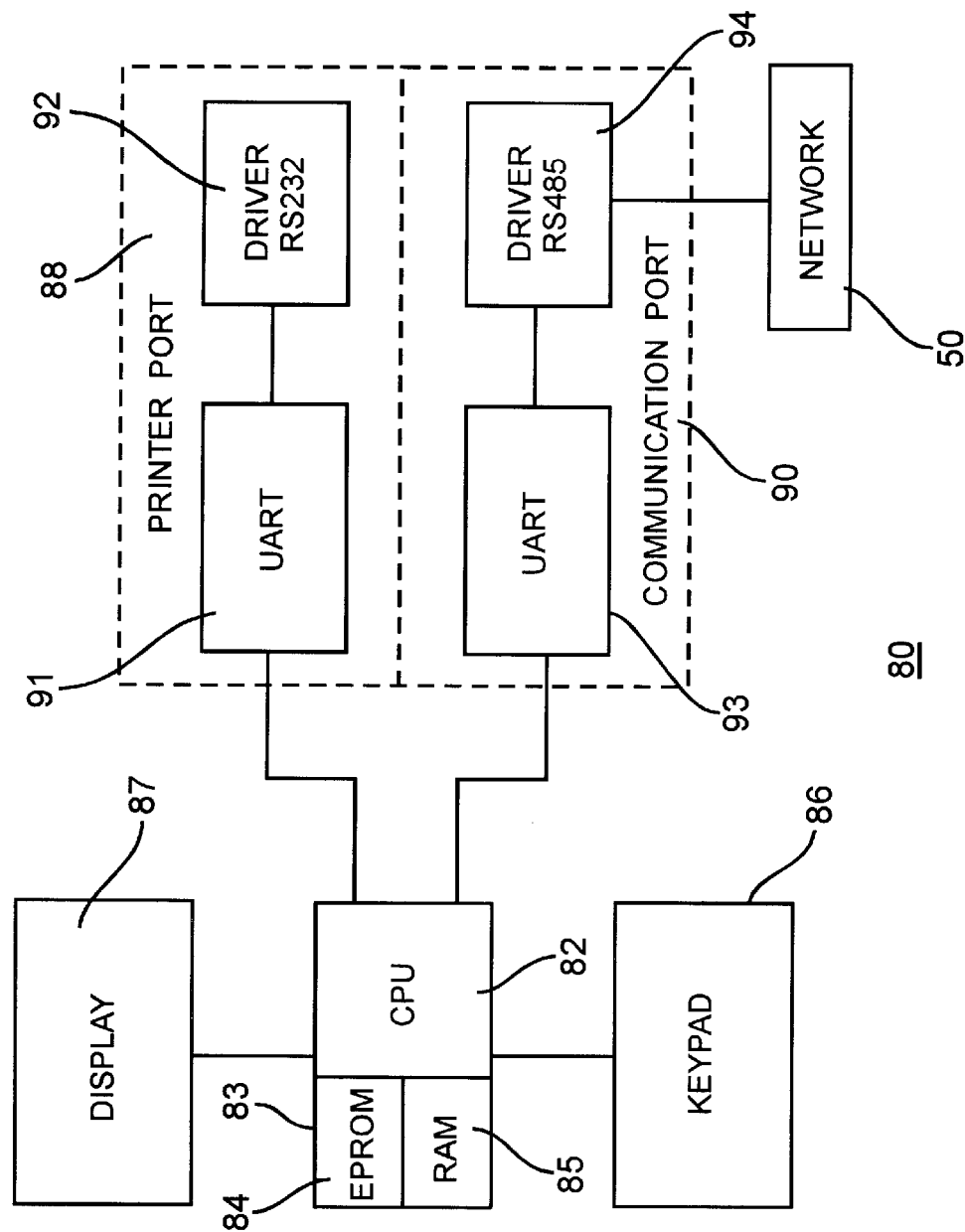
FIG. 4 is block diagram of a primary master data entry panel according to the present invention.

A basic block diagram of the essential components of a data entry panel 80 is shown in FIG. 4. A CPU 82 has access to memory 83 consisting of an EPROM 84 and RAM 85. EPROM 84 contains the device's operating program, including the communication and data handling protocols. A keypad 86 is used for entering data and could be a full sized keyboard, a matrix keypad, or a mouse. The display 87 is used display data from a selected timer or could be used to display various menus for use in conjunction with a mouse to enter data. There will typically be two communication ports 88, 90, each consisting of an UART 91, 93 and a driver 92, 94. Port 88 is used to connect a printer or other data collection device. Port 90 is used to connect to the network 50, using an RS-485 half-duplex connection. Other specifications could be used and the present invention is not to be restricted to the type of connection employed. The data entry panel can be used to connect directly to the network 50, whereby it functions as a master device 72, or it can be dedicated to a particular timer for individual monitoring and control of that device only, as either a database or primary master.

Figure 5:
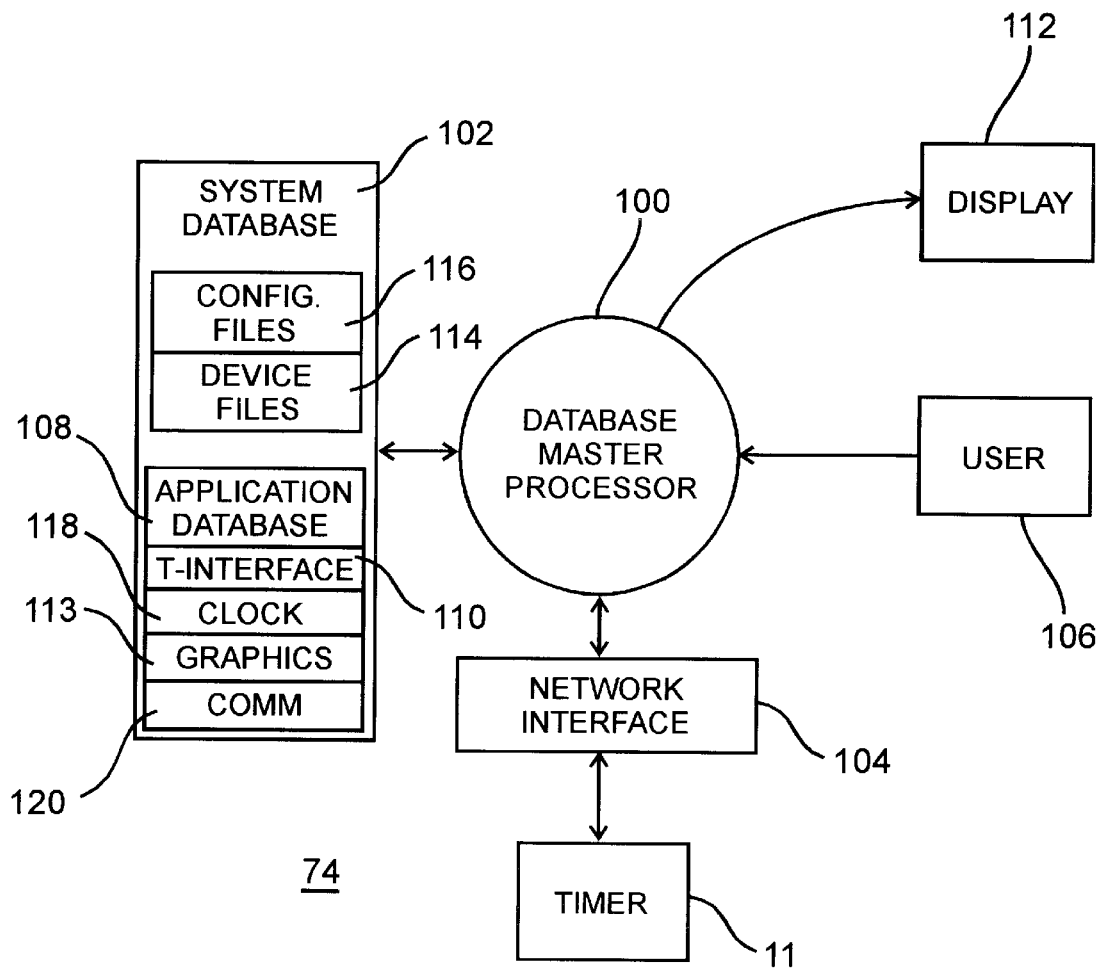
FIG. 5 is block diagram of a master operator interface panel functioning as a master database device according to the present invention.

The PC based data entry panel 74 has similar basic components as DEP 80, as shown in FIG. 5. Since it is the database master, its processor 100 controls the system database 102 and makes it assessable to the network 50 through its network interface 104. A user 106 can access data from a welder controller through its timer module 11, based upon its individual data structures and types, through embedded timer objects within an interface identified as a T-interface method 110, which is part of the application program 108. The data can then be monitored by display 112 through various graphic methods which are well known and are not an object of the present invention. Object oriented programming techniques are incorporated in the application program 108. This allows the use of timer object models, inherited from a base class object in T-interface 110 acting as a parent, to provide a data layer interface between the data display layer and the physical devices on the network 50. The physical devices on the network are modeled as objects, with their characteristics and behaviors encoded into data fields and methods. This method, also known as encapsulation, combines a record with procedures and functions that use it to form the object. Once the object is defined in the T-interface 110, it is used to build a hierarchy of descendant objects, with the descendant objects inheriting access to all of its ancestors' data and methods. The system is also polymorphic in that one name is used for a particular action throughout an object hierarchy, with each object in the hierarchy implementing the action in a manner appropriate only to itself. This allows additional and different types of timers to be accessed by the user 106 from the DEP 74, regardless of the data type of the additional timers. The specific weld timer data is private to the timer object model in T-interface 110 and is stored in a separate device file 114. This data can only be accessed through methods defined in the T-interface 110. Conversion of all data received from the network 50 is done in the device file 114. It contains all the information about the data records and structures and inherits its methods from the T-interface file 110. This allows these methods to be maintained across all separate device files 114 without having to modify each one for special conditions that may occur. Typical data in these files will consist of the latest weld data, any fault occurrences, and other pertinent data.

Since multiple slave units and multiple master devices may exist in a typical configuration of the network 50, means exist to identify the destination, either a timer or a master, and the originator, master or slave, of a message packet. Two address-fields, consisting of a single byte are included in a message packet header specifying the intended destination and originator network device number.. This address information is stored in a configuration file 116 that is created during setup. This file tells how to set up memory images for each timer. In addition to the address of the timer, its data type is also listed in the configuration file.

Although the network 50 can be theoretically populated with any number of master and slave devices, the preferred number of device slave loads in keeping with the RS-485 standard is 31, with up to 5 master devices. The network medium can be a shielded twisted pair. The transmitting devices are considered to have tri-state outputs. Each character transmitted consists of a start bit, eight data bits, and one stop bit. which requires ten bit times for transmission. Parity checking is not part of the character. The message packets have two basic forms, either as a master request or as a slave response.

Each master-originated message packet consists of a minimum of three distinct fields: header, command, and trailer. Additional fields are present only if the master is sending data to the timer via a setup type command, as would be the case if the master was downloading welder schedule, for instance. They appear in the packet as follows:

| Header | Command | Text length | Text | Trailer |
|---|---|---|---|---|
| (required) | (required) | (optional) | (optional) | (required) |

The header field of all master-originated packets, consists of the ASCII control sequence DLE-STX, followed by the network address of the destination slave/master or broadcast and then the address of the originating master. The destination address is defined as the recipient's physical address and the originator address is defined as the device's own physical address. The address fields are treated as transparent text and the DLE-STX is treated as a literal.

| MASTER HEADER | | | |
|---|---|---|---|
| DLE | STX | destination address | originator address |

Each master device has two physical addresses assigned to it. As the device attempts to connect to the network it may promote itself to pseudo-primary status or it may be demoted to pseudo-secondary status if a higher status device connects to the network.

The command set is divided into several subsets, which contains related commands. Each command has two parts, the requester's data packet and the slave's response. The requester's data packet may be in the form of setup (write) data or status (read) data. The command field consists of four bytes. The first byte contains the message transaction code (device command code). The second byte of the four byte command field may contain optional weld program code, as defined by the applications device command layer. The third byte indicates the index of the schedule number or stepper number applicable to the command. The fourth byte is defined by the device command layer as a secondary schedule. If a field is not required for the given Command, it is set to $00.

The entire command field is presented in the form of transparent text.

| COMMAND | | | |
|---|---|---|---|
| Command | Weld Program Code | Index | Secondary Schedule |

The packet trailer is composed of the ASCII control sequence DLE-ETX followed by the Block Check Character (BCC). The trailer field length is three bytes and is treated as a literal. If the BCC equals a DLE value no additional DLE is added:

| TRAILER | | |
|---|---|---|
| DLE | ETX | Check Character |

The Block Check Character byte is the two's complement of the eight-bit (modulo 256) sum of all transparent text bytes excluding the inserted DLEs. Thus, the Block Check Character spans the actual retained data of the Addresses, Command, Text Length and Text fields. When the Block Control Checksum byte is added to this sum (modulo 256), the result must be zero.

Each slave response message packet consists of a minimum of four distinct fields: header, command, status and trailer. The additional fields are present only if there is data. They appear in the packet as follows:

| Header | Command | Status | Text length | Text | Trailer |
|---|---|---|---|---|---|
| (required) | (required) | (required) | (optional) | (optional) | (required) |

The header field of all slave-response packets, consists of the ASCII control sequence DLE-SOH, followed by the network address of the request originating master and then the responding slave address. The destination address is defined as the recipient's physical address and the originator address is defined as the device's physical address. The address fields are treated as transparent text and the DLE-SOH is treated a literal.

| DLE | SOH | destination address | originator address |
| --- | --- | --- | --- |

The command and trailer fields are the same as the command and trailer fields sent by the master device. Within every slave response packet, there are two status fields, Timer and Error. Status fields are considered as Transparent Text. Timer status refers to existence of certain timer elements, such as memory and coprocessors, operating conditions, comm port connection, data transfers, panic conditions, download mode settings, and so on. Error status provides an indication of various operating conditions that could cause a timer to malfunction. These conditions have preprogrammed fault codes and include such items as voltage, current, and temperature faults, invalid weld schedule data, and any other pertinent data peculiar to weld control systems.

| Status Field ||
| --- | --- |
| Timer Status | Error Status |

The text length field indicates the total bytes that make up the text field that follows it, not including transparent DLE bytes. If no text is present then the field is $0000. The field length is two bytes typecast as an integer and is presented in the form of transparent text. The data requested by the specified command from the master is present in the text field. This field is also presented in the form of transparent text.

Certain fields in a message packet (specifically the Command, Status, Text length and Text fields, and the address data in the Header field) are presented in the form of transparent text. Since the link protocol utilizes DLE sequences as message and field delimiters, it is necessary to distinguish between the beginning of a control (DLE) sequence and the appearance of a DLE-valued byte in the normal Command or Text data streams. This distinction is provided by DLE-insertion, which requires that any such DLE-valued data be preceded by a DLE prefix. Thus, the sequence DLE-DLE is regarded as a single data byte of value DLE when it occurs within such a data stream and only a single DLE need be included in the construction of the Block Control Character field; any single DLE encountered in such a stream is interpreted as a link-control prefix. All data that is indicated to be of Transparent Type is included in the construction of the packet Block Check Character field.

Broadcast messages can be sent to all devices connected to the network 50. Only a master device may broadcast messages. A master originated packet with destination address of zero ($00) is interpreted as a broadcast message to all slave units, and a master originated destination address of $80 is interpreted as a master to master broadcast. No slave unit can originate a broadcast message on the network. The only message that should be sent as "Broadcast" is the Fault Reset Action Poll. The timer will not test for inappropriate broadcast messages, it will simply not respond and the master will not know if the request was correctly acted upon by all timers.

As part of the timing requirements of the network, certain conditions exist to maintain control. After a request for data, the responding device must complete the response within certain time out values. This varies between 100 milliseconds for master to master requests and up to 2000 milliseconds for slave response. The Master can not initiate messages at any interval less than 35 milliseconds to the network or to any individual timer.

The three modes of master device operation have been described as the database master 74, primary master 76, and secondary master 72. During setup of the communications network, the master devices are assigned a physical address that defines the its type and priority within the network. The database master 74 is the only device which can automatically download data to a timer 62–66 based on a revision status. It has the highest priority as a network arbitrator or arbiter. The primary master 76 will act as the network arbitrator in the absence of a database master. A secondary master must listen for an access grant from the current network arbiter, before initiating a message packet on the network 50. When no database or primary device exists on a network, the secondary device with the highest priority, as defined by its address during startup, assumes the role of network arbitrator as a pseudo-primary. As a pseudo-primary device, it may be "killed" and re-started as a secondary device, by a database or primary device at the time they are reattached to the network.

Communication between master devices consists of a set of commands, defined below that control or arbitrate the network 50. A secondary grant message is issued only by the network arbiter to allow periodic attachment of the physically addressed secondary device. If the secondary device fails to receive a grant within a preset time-out period and no other network traffic is heard, a network restart sequence will result with the master device with the highest arbitration priority attempting to take control as the network arbitrator. The periodic rate of grants is determined by the application layer for a given master. The master will always attempt to grant a given secondary device access to the network 50 even if the secondary device does not respond to every grant. The secondary device which has the physical address contained in the last grant message will send a secondary response message. If no response is heard by the network arbiter, the network arbiter will continue it's normal operation, assuming that the secondary device is currently not present. After receiving a secondary response, the system arbiter will send a Secondary Go Ahead message immediately back to the secondary device. If it hears this message after responding to a grant it assumes temporary control of the network. During this control time it may send any number of messages to any number of slaves as long as it continues to maintain valid network traffic. It can not grant any other device access to the network, however. After completing it's network requirements, it releases control of the network 50 back to the arbiter by sending a Secondary Release message to the network arbiter to allow it to take control of the network as fast as possible after the secondary device completes it's network requirements. If, however, this message is not received by the arbiter and no valid traffic is heard by the arbiter, it will, after a time-out period, take back control of the network.

A Master Kill Secondary message is sent as a broadcast message to all devices connected to the network whenever a master device which believes it has the highest arbitration status connects to the network Before this message is sent, the newly connected device waits to receive a Secondary Grant from the current arbitrating master and then it must successfully attach to the network as a secondary device. Immediately after attaching it will send this message. After hearing the message all other master devices will attempt to restart as a secondary device or as a pseudo-secondary device.

A Secondary Clock Sync message is sent only by the network arbiter in an attempt to synchronize all of the real time clocks of the secondary devices. It can be sent as a broadcast message to the timers to synchronize their individual clocks 49.

Figure 6:
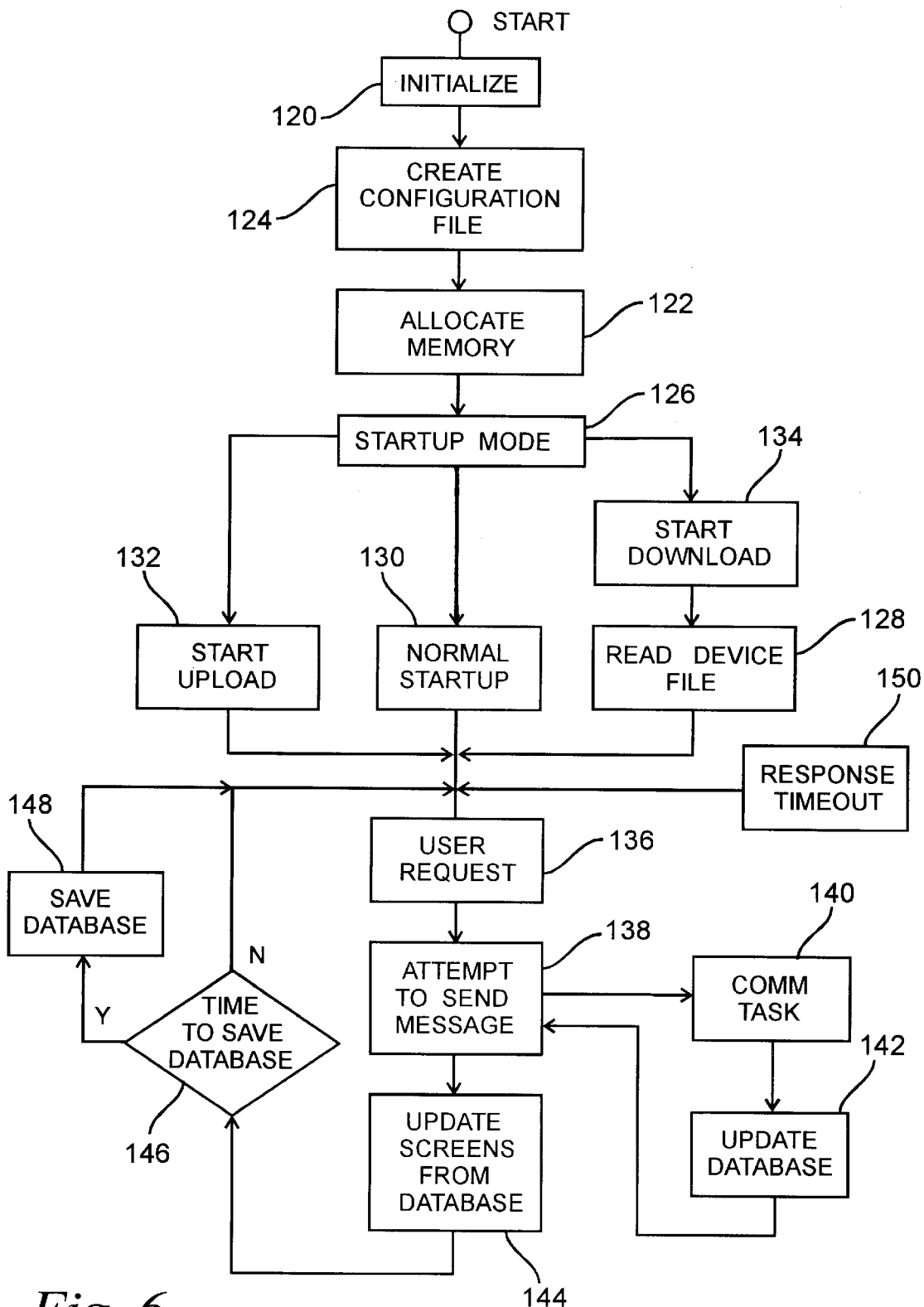
FIG. 6 is simplified flow chart detailing an overview of the master database device's communication control according to the present invention.

The dataflow diagram shown in FIG. 6 provides an overview of the operation of the preferred embodiment of a database master 74 of the present invention. At start 120, the database master will create configuration files 124 which identify which types of timers 11 (slaves) are present on the network 50 and will allocate sufficient memory 122 as determined by a user. These files 124 tell how to set up memory images in device files for each slave device on the network. The database manager will determine if the startup mode is a normal startup 130, upload 132, or download 134 operation. If it is a download, it will read data 128 from the device file in the database file for device revision control. Once the database master is in control of the network 50 as the arbiter, it will wait for a user request 136 or after a predetermined time whereby the database manager may scan the network for status changes or data changes as determined through regular revision polling. The user request could be in the form of an input from a keyboard or a mouse operation 86 in response to prompts from a graphics menu on display 87. The database manager 74 will attempt 138 to send the message through communications task 140. Once a response is received 142, the appropriate display screens will be updated 144 and the database manager will determine 146 if the received data should be saved 148 to the system database or not. If no response is received 150 from the addressed device within a predetermined period of time, the master will decide that the device is not present and perform some type of error routine as set by the user. The database manager will then wait for the next request. It may also relinquish its status as network arbiter and let other primary and secondary masters to assume control as the arbiter at this time, until another user request 136 is received.

Figure 7:
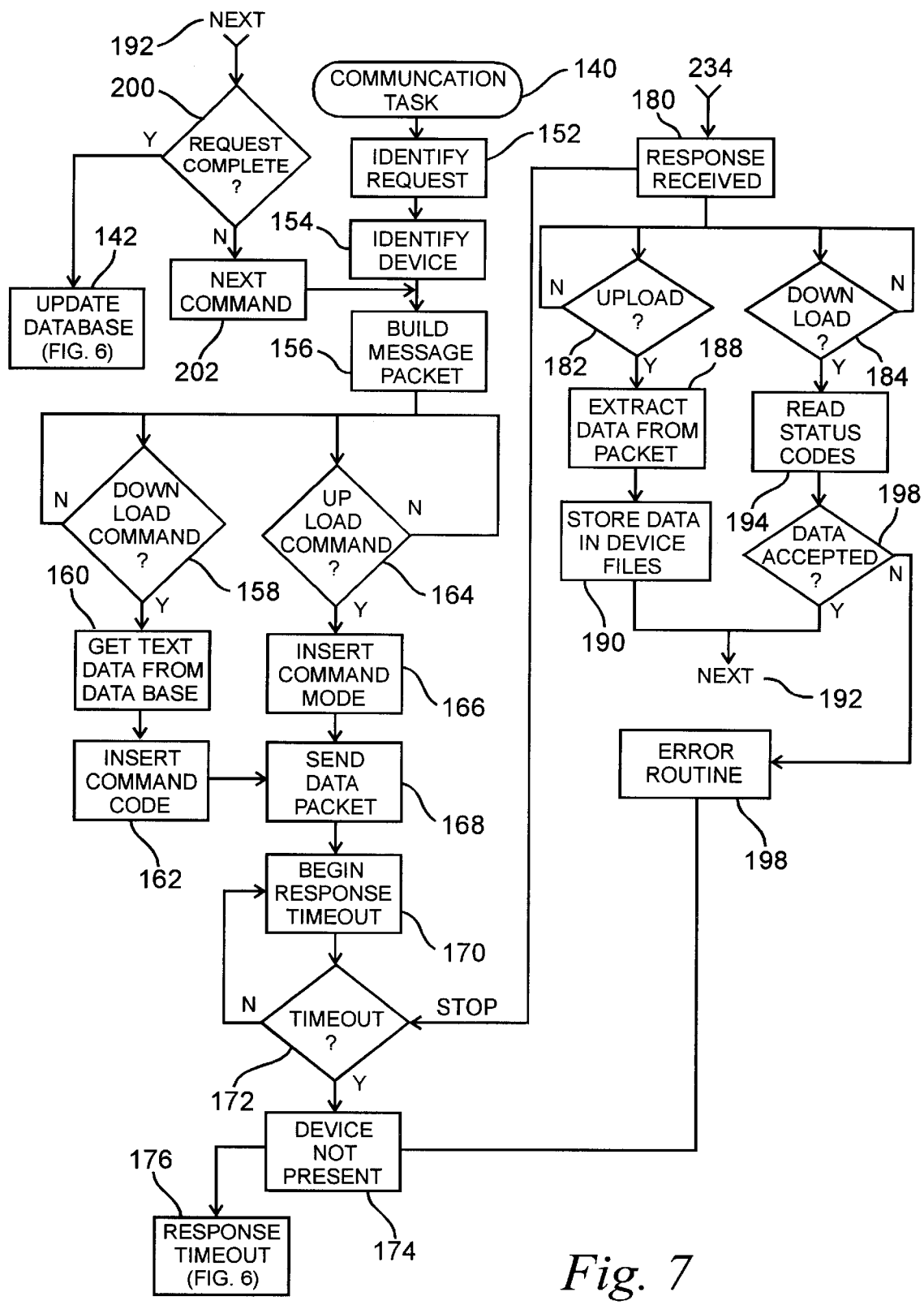
FIG. 7 is detailed flow chart detailing the master database device's communication task according to the present invention.

FIG. 7 details the master database device's communication task 140 according to the present invention. Once a user request 136 has been received and decoded, the request will be identified 152 as upload or down load command. The receiving device will also be identified 154. Using this information, the master will build the message packet 156 using the data structure contained in the device file of the identified device in the masters database files. The data packet will be constructed through the T-interface file 110 and will have the necessary header, addressing, and trailer codes. If the user request is a download command 158, such as loading a new weld schedule to the timer, the master will get the data from the system database and insert the particular command code 162 for downloading the schedule to the timer. If the request is an upload command 164, the particular command code for the requested data will be inserted into the message packet, as previously discussed. Once the message packet has been constructed it will be sent 168 to the addressed device over the network 50. When it is sent, a response timer will start 170 timing. If a return message is not received within a preset time 172, the master will assume that the device is not present 174 and set a response time-out flag 176. The master will then go into some type of routine as determined by the user program. Once a response has been received 180, the master will determine if the received message is an upload 182 or download 184 message. A stop signal 186 will also stop the response timer 170 from timing at this time. For an upload command, the requested data will be extracted 188 from the packet and stored in the responding device's device file 190. If the response was from a download command, the status code in the data packet will be read 194 to determine if the data that was sent by the master 168 was received and accepted 196 by the addressed device. If the data was not accepted, a error routine 198 will be started. This routine can take several forms and is dependent on the application program. It could take the form of just resending the original message a number of times, for instance, before it determines that the device is not present 174. If the data has been accepted 196, the master will determine if the request has been completed 200. If a welder schedule is being downloaded, it will take several commands 202 and runs through the communication task 140 to complete the downloading as many message packets will have to be sent before the request has been completed. Once the request has been completed, the system database files will be updated 142 with the current status of the addressed timer.

Figure 8:
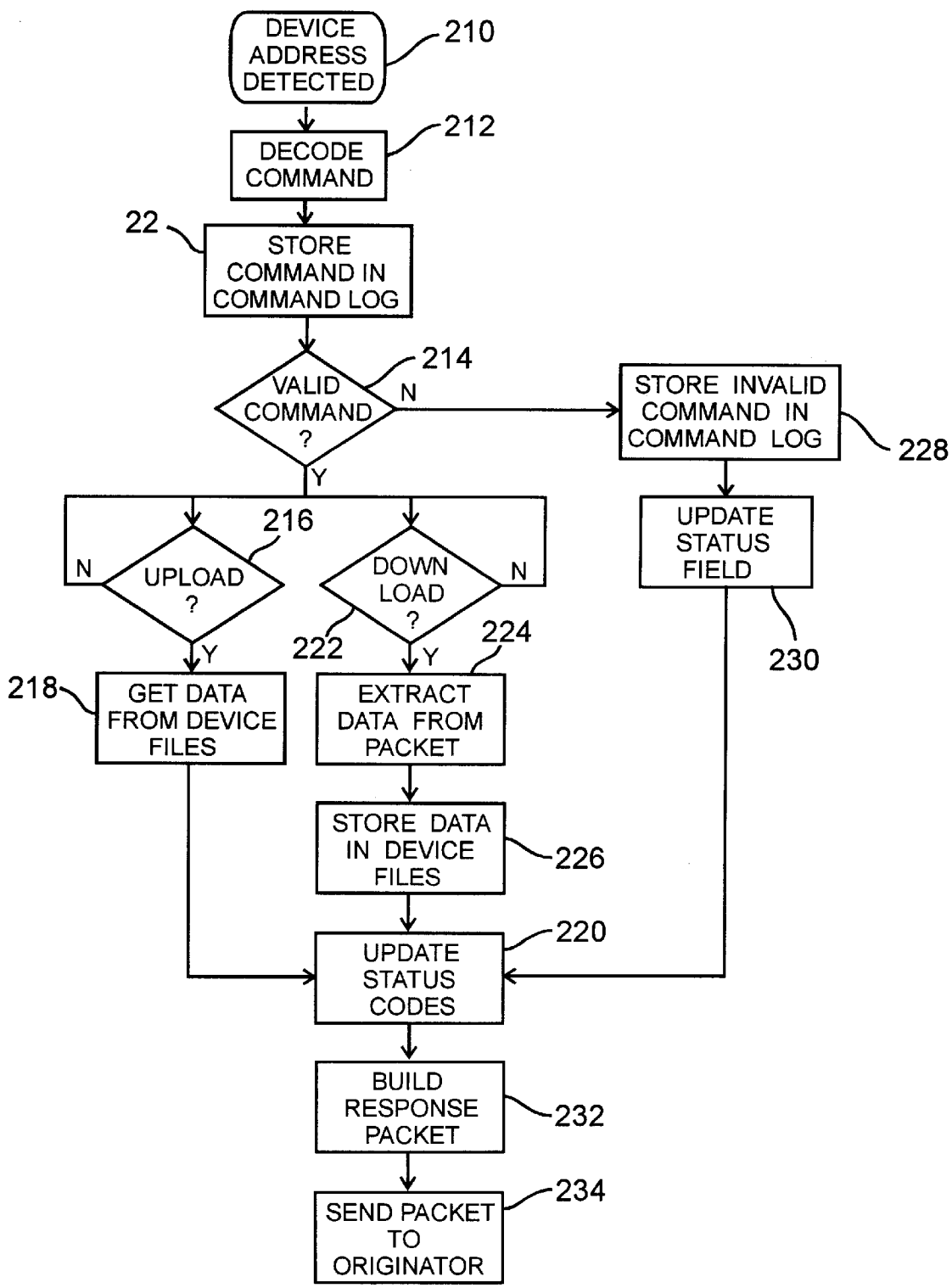
FIG. 8 is detailed flow chart detailing the slave device's communication response according to the present invention.

The slave device's communication response is detailed in the flow chart of FIG. 8 according to the present invention. The individual slave devices are continuously listening to the messages on the network 50 for their address. Once their address is detected 210, it will decode 212 the command embedded in the message package, store the command 213 in the command log 59, and determine if the received command is a valid command 214 for itself. For an upload command 216, the requested data will be extracted 218 from data files resident in the timer and inserted in the response message packet. The status code and command codes in the message packet will also be updated 220. If the response was from a download command 222, the received data will be extracted 224 and stored 226 in the data files resident in the timer. The status code in the data packet will be updated 220 to indicate that the data sent by the master was received and accepted. If the received command is not valid 214, the command will be stored 228 in the command log 57 as an invalid command, the status field of the message packet will be updated 230 to indicate that an invalid command has been received. Once all data has been extracted or added, and the status codes have also been updated, the device will build the response message packet 232 and send the packet back to the originator 234.

The methods detailed above are applicable to many different types of applications within and without welder control systems. Weld control schedules can be swapped from one welder to another using the upload and download commands between the master and slave devices. One particular weld schedule could be copied to all other welders one the network. The readily available weld data is adaptable for use in statistical process control through the master database. The gateway device to other communication networks provides countless control strategies.

While the specific embodiments have been illustrated and described, numerous modifications are possible without departing from the scope or spirit of the invention. Although the system is described for use with a welder controller, the system could be adaptable for use with any type of communication control system having devices with different data structures communicating and passing data between themselves.

We claim:

1. A weld controller system for controlling the operation of a welder including a weld transformer and at least one pair of contact tips that apply current to create heat between at least two workpieces, the weld controller system comprising:

A. a microprocessor;

B. welder power means controlled by a weld program operating by the microprocessor and operatively connected to the weld transformer for supplying weld current to the contact tips to create said heat in said workpiece, said weld program for increasing the weld heat in increments following a predetermined weld schedule having a plurality of weld cycles to provide compensation for deterioration and wear of said contact tips;

C. a current sensor for sensing current supplied by said welder power means to said weld transformer, said current sensor for providing weld current data for use by said weld program;

D. a voltage sensor for sensing input voltage supplied to said weld power means, said voltage sensor for providing weld voltage data for use by said weld program;

E. a memory for storing said program, weld current data, and voltage data;

F. a first communication port for coupling said weld controller system to a communications network, said network including at least one system operator interface unit, said system operator interface unit including a system database for storing said weld current data and voltage data for use in monitoring, controlling, and editing said weld controller system;

G. a time of day clock for providing a chronological reference to tag the weld current and voltage data and other data when it occured for storage in said memory and accessible by said system operator interface unit for storing in said system database; and H. a memo pad accessible to the network for storing data for diagnostic purposes, said data including faults, events, and other operational data.

2. The weld controller system of claim 1 further including a second communication port for coupling said weld controller system to an operator interface unit, said operator interface unit for use in monitoring and controlling said weld controller system and for creating and editing said weld program.

3. The weld controller system of claim 2 wherein said operator interface unit includes a communications port for coupling said weld controller system to a separate and different communications network, said communications network including a different database system for creating and editing said weld program.

4. The weld controller system of claim 3 wherein said first and second communication ports can be configured to operate independently or simultaneously to communicate with multiple operator user interfaces, said simultaneous communication providing a redundant command control.

5. The weld controller system of claim 1 wherein said time of day clock time stamps operating conditions at each increment of said weld schedule, such conditions including number of welds, voltage conduction angle, weld current, and line voltage, said time stamped data for storage in a data log file.

6. The weld controller system of claim 5 wherein said time of day clock time stamps a fault condition when it occurs in said weld controller, said time stamp fault condition for storage in a fault log in said said data log.

7. The weld controller system of claim 6 further including an external memory means for a backup of said memory, said external memory for storing said program, weld current data, and voltage data.

8. The weld controller system of claim 7 wherein said time of day clock time further including means for providing an automatic, time based backup command for storage of said program, weld current data, and voltage data in said external memory.

9. The weld controller system of claim 8 further including means for downloading data from said dedicated operator interface unit to said memo pad and means for uploading data from said memo pad to said dedicated operator interface unit.

10. The weld controller system of claim 9 further including means for uploading data from said memo pad to said system operator interface unit.

11. The weld controller system of claim 10 wherein said communication network includes a gateway to another communications network, said gateway allowing said weld controller to upload and download data through said gateway to other system databases in other operator interface units.

12. The weld controller system of claim 8 further including means for said system operator interface unit to synchronize said time of day clock with its own time of day clock.

13. A weld controller system for controlling the operation of a welder including a weld transformer and at least one pair of contact tips that apply weld current to create heat between at least two workpiece said system comprising:

A. a microprocessor;

B. a weld program operating in said microprocessor, said program for increasing said weld heat in increments following a predetermined weld schedule having a plurality of weld cycles;

C. a current sensor for sensing current supplied by said welder power means to said weld transformer, said current sensor for providing weld current data for use by said weld program;

D. a voltage sensor for sensing input voltage supplied to said weld power means, said voltage sensor for providing weld voltage data for use by said weld program;

E. a memory for storing said weld program, weld current data, and voltage data;

F. a first communication port for coupling said weld controller system to a to a dedicated operator interface unit, said operator interfaceunit for use in creating and editing said weld program;

G. a time of day clock for providing a chronological reference to tag the weld current and voltage data and other weld data when it occured for storage in said memory and accessible by said data entry unit; and H. a memo pad for storing data for diagnostic purposes, said data including faults, events, and other operational data and said memo pad accessible to said data entry unit.

14. The weld controller system of claim 13 further including a second communication port for coupling said weld controller system to a communications network, said network including at least one system operator interface unit, said operator interface unit including a system database for storing said weld current data and voltage data for use in monitoring, controlling, and editing said weld controller system, wherein said weld controller sends and receives data packets to said system database in response to requests from said system operator interface unit and regardless of said system database's data structure.

15. The weld controller system of claim 14 wherein said first and second communication ports can be configured to operate independently or simultaneously to communicate with multiple operator user interfaces, said simultaneous communication providing a redundant command control.

16. The weld controller system of claim 14 wherein said time of day clock time stamps operating conditions at each increment of said weld schedule, such conditions including number of welds, voltage conduction angle, weld current, and line voltage, said time stamped data for storage in a data log file.

17. The weld controller system of claim 16 wherein said time of day clock time stamps a fault condition when it occurs in said weld controller, said time stamp fault condition for storage in a fault log in said data log file.

18. The weld controller system of claim 17 further including an external memory means for a backup of said memory, said external memory for storing said program, weld current data, and voltage data.

19. The weld controller system of claim 18 wherein said time of day clock time further including means for providing an automatic, time based backup command for storage of said program, weld current data, and voltage data in said external memory.

20. The weld controller system of claim 19 further including means for downloading data from said dedicated data entry unit to said memo pad and means for uploading data from said memo pad to said dedicated data entry unit.

21. The weld controller system of claim 20 further including means for uploading data from said memo pad to said system operator interface unit.

22. The weld controller system of claim 19 wherein said communication network includes a gateway to another communications network, said gateway allowing said weld controller to upload and download data through said gateway to other system databases in other operator interface units.

23. The weld controller system of claim 19 further including means for said system operator interface unit to synchronize said time of day clock with its own time of day clock.

24. The weld controller system of claim 13 wherein said dedicated operator interface unit further including a communication port for coupling said weld controller system to a second communications network, said second communications network including a different database system for creating and editing said weld program.

* * * * *